(12) United States Patent
Godley, Jr.

(10) Patent No.: US 8,104,252 B1
(45) Date of Patent: Jan. 31, 2012

(54) MULTI-FUNCTIONAL TOOL HEADS FOR LAWN MOWERS AND ASSOCIATED METHOD

(76) Inventor: James E. Godley, Jr., Newark, NJ (US)

( * ) Notice: Subject to any disclaimer, the term of this patent is extended or adjusted under 35 U.S.C. 154(b) by 0 days.

(21) Appl. No.: 12/700,140

(22) Filed: Feb. 4, 2010

(51) Int. Cl.
*A01D 43/08* (2006.01)

(52) U.S. Cl. .................................. 56/2; 56/244

(58) Field of Classification Search ............ 37/244, 37/242, 243, 254, 348, 2; 180/65.26, 65.23, 180/65.24; 56/2; 701/23; 15/83; 172/42
See application file for complete search history.

(56) References Cited

U.S. PATENT DOCUMENTS

| | | | |
|---|---|---|---|
| 3,603,162 A * | 9/1971 | Gohler | 74/16 |
| 3,758,967 A * | 9/1973 | Thompson | 37/242 |
| 3,882,615 A | 5/1975 | Williams | |
| 4,064,679 A | 12/1977 | Spinner | |
| 4,278,133 A | 7/1981 | de Marcellus | |
| D269,092 S | 5/1983 | Davies, III | |
| 4,833,800 A | 5/1989 | Ting | |
| 5,052,135 A | 10/1991 | Fontaine | |
| 5,090,142 A * | 2/1992 | Peters | 37/243 |
| 6,182,383 B1 * | 2/2001 | Reed, Jr. | 37/242 |
| 6,345,489 B1 * | 2/2002 | Everts et al. | 56/12.7 |
| 6,600,981 B2 * | 7/2003 | Ruffner | 701/23 |
| 6,622,804 B2 * | 9/2003 | Schmitz et al. | 180/65.245 |
| 6,926,091 B2 * | 8/2005 | Lee | 172/52 |
| 6,945,021 B2 * | 9/2005 | Michel | 56/249 |
| D519,127 S * | 4/2006 | Shaffer et al. | D15/10 |
| D524,824 S * | 7/2006 | Shaffer et al. | D15/10 |
| 7,134,516 B2 * | 11/2006 | Eisenhardt et al. | 180/65.235 |
| 7,257,909 B2 * | 8/2007 | Shaffer et al. | 37/242 |
| 7,610,975 B1 * | 11/2009 | Gust et al. | 180/65.245 |
| 7,836,614 B2 * | 11/2010 | Parker | 37/246 |
| 7,866,068 B2 * | 1/2011 | Van Buren et al. | 37/244 |
| 2001/0032447 A1 * | 10/2001 | Jolliff et al. | 56/16.7 |
| 2002/0124540 A1 * | 9/2002 | Everts et al. | 56/12.7 |
| 2002/0148114 A1 * | 10/2002 | Ruebusch et al. | 29/888.01 |
| 2003/0079455 A1 * | 5/2003 | Suchdev et al. | 56/16.9 |
| 2004/0149456 A1 * | 8/2004 | Jolliff et al. | 172/42 |
| 2005/0097788 A1 * | 5/2005 | Wakitani et al. | 37/348 |
| 2010/0064556 A1 * | 3/2010 | Lau | 37/242 |

* cited by examiner

*Primary Examiner* — Arpad Fabian-Kovacs

(57) ABSTRACT

A combined reel lawn mower and multifunctional blade assembly includes a front attachment assembly removably conjoined to a body of the lawn mower. A shaft is removably interfitted within lateral sides of the body. A plurality of knobs may be affixed to the axially opposed end portions of the shaft. Each of the knobs may include a pair of spring-actuated fingers. A vertically adjusting mechanism may include a rectilinear bar countersunk within a recess formed at a bottom surface of the body. A pair of rollers may be journaled about axially opposed ends of the bar. A lever may be directly coupled to the bar. A rectilinear arm may be mated to the lever. The arm may further include a distal end removably interfitted within the aperture of the one knob for preventing and allowing rotational movement of the front attachment assembly when the lever is rotatably displaced.

8 Claims, 11 Drawing Sheets

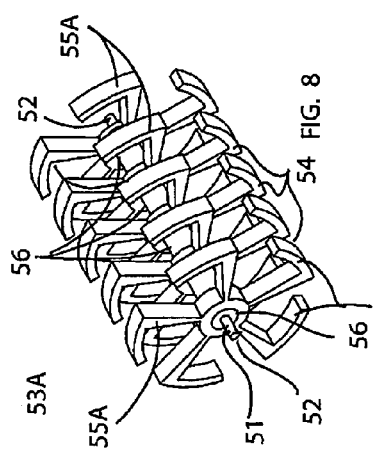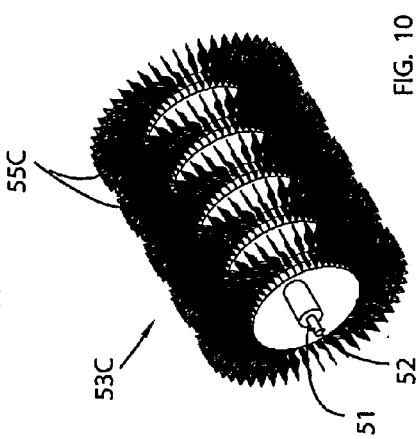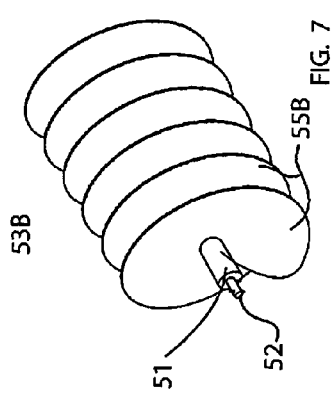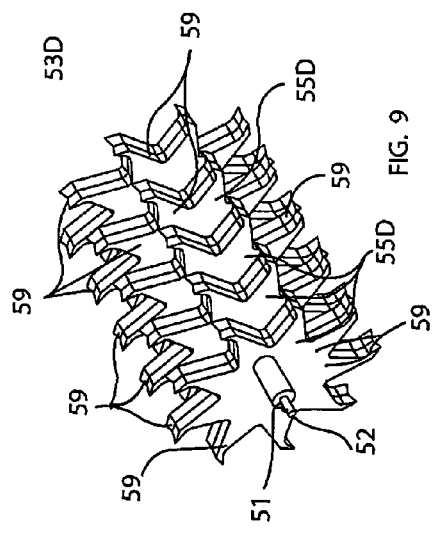

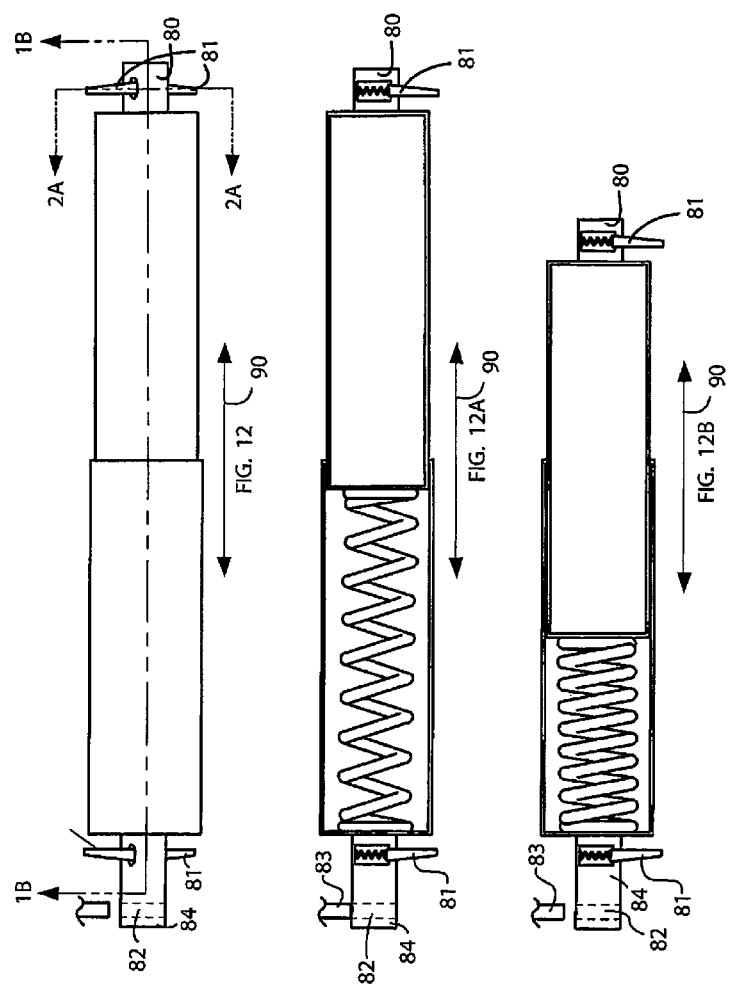

MULTI-FUNCTIONAL TOOL HEADS FOR LAWN MOWERS AND ASSOCIATED METHOD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to lawn mowers having detachable tool heads and, more particularly, to multi-functional tool head locking and adjusting mechanisms for lawn mowers.

2. Prior Art

At the present time, home owners who must cut their lawns, rake leaves, till soil, and shovel snow may purchase separate machines for each of these tasks. No one machine will perform all four tasks or even adequately perform any two of the tasks. Some lawn mowers will pick up some of the debris on a lawn, but they are not able to pick up debris embedded in the lawn. For functional convenience all lines of equipment are often provided with their own power source, and thus present a substantial duplication in cost and storage.

Some attempts have been made in the prior art to solve this problem. One prior art example shows a shearing attachment conformed for selectively engaging the lower edge of a snow blower including a set of toothed blades reciprocated relative each other. The reciprocal power may be derived from the forward motive power of the blower, conforming the blower for lawn growth cutting. Unfortunately, such an arrangement does not provide any means of removing snow from a lawn, or for tilling hardened and/or poorly aerated soil.

Another prior art example shows a multi-use lawn care machine which can be used as a lawn mower, lawn sweeper or snow blower. The machine has a generally cylindrical housing to hold the tool (a snow blower reel, lawn mower reel, or lawn sweeper attachment) in use. Such a machine, however, is rather bulky in design, making it difficult to maneuver and transport between remote locations. Furthermore, as mentioned herein above, the present device also lacks the ability to effectively till and aerate soil.

Accordingly, a need remains for multi-functional tool heads for lawn mowers and like equipment in order to overcome the above-noted shortcomings. The present invention satisfies such a need by providing multi-functional tool heads that are easy to interchange and use, is compact and portable in design, is versatile in its applications, and requires much less storage space than a multitude of separate machines. Such multi-functional tool heads advantageously allows a user to properly care for their lawn and the remainder of their property without having to purchase multiple expensive machines for each task. The multi-functional tool heads for lawn mowers and like equipment can also easily be used by homeowners caring for their own lawns, or by professional landscapers tending to a contracted property.

BRIEF SUMMARY OF THE INVENTION

In view of the foregoing background, it is therefore an object of the present invention to provide an apparatus for multi-functional tool heads for lawn mowers and like equipment. These and other objects, features, and advantages of the invention are provided by a combined reel lawn mower and multifunctional blade assembly for attachment to a body of the reel lawn mover to allow a user to perform various seasonal functions.

The combined reel lawn mower and multifunctional blade assembly may include a front attachment assembly removably conjoined to a front end of the body with a mechanism for vertically adjusting a front end of the body such that the front end of the body is lowered and raised above a ground surface. The body may further include a mechanism for rotating the front attachment assembly in clockwise and counter clockwise directions. The front attachment assembly may further be automatically locked and unlocked between non-rotatable and rotatable modes when the front end adjusting mechanism vertically lowers and raises the front end of the body respectively. Such an arrangement provides the unexpected and unpredictable advantage of ensuring that the front attachment is rotatable only when positioned for use horizontally on the ground.

The front attachment assembly may further include a shaft preferably having axially opposed end portions directly and removably interfitted within lateral sides of the body. The shaft may further be resiliently reciprocated along a bi-directional linear path extending parallel to a longitudinal length of the shaft. A plurality of knobs may be affixed to the axially opposed end portions of the shaft respectively and outwardly passing through the lateral sides of the body such that the knobs are disposed exterior of the body respectively. Each of the knobs may further include a pair of spring-actuated fingers protruding outwardly therefrom. The longitudinal length of the shaft may further be selectively adjusted between extended and contracted positions when each of the spring-actuated fingers at each of the end portions of the shaft are displaced to a compressed position and thereby inwardly passed through the apertures of the lateral sides of the body respectively. Such an arrangement provides the unexpected and unpredictable advantage of having a snap-on capability for easily and conveniently attaching the shaft to the body without the need to use additional tools.

The front end adjusting mechanism may further include a rectilinear bar countersunk within a recess formed at a bottom surface of the body. Such a recess may be disposed proximal to the front end of the body and traversing along an entire width thereof. A pair of rollers may be journaled about axially opposed ends of the bar. A lever may be directly coupled to the bar and protruding outwardly from the body in such a manner that the lever is rotatably biased between up and down positions and thereby bias the rollers between the raised and lowered positions respectively.

The rollers may further be adapted to directly engage the ground surface and cause the front attachment assembly to rise and fall as the lever is adapted between the up and down positions respectively. One of the knobs may further be provided with an aperture formed therein. Such an arrangement provides the unexpected and unpredictable advantage of using the rollers as a fulcrum to assist in raising the front attachment assembly so that less strength is needed by a user when assembling the front attachment assembly.

The front end adjusting mechanism may further include a rectilinear arm preferably having a proximal end mated to the lever and protruding forwardly towards the front end of the body. The arm may further include a distal end removably interfitted within the aperture of the one knob. In this way, the arm is automatically urged forwardly towards the one knob and thereby interfitted within the aperture when the lever is rotatably displaced to the down position. The arm may further be automatically urged rearwards away from the one knob and thereby ejected from the aperture when the lever is rotatably displaced to the up position.

The power-operated reel lawn mower may further include a gas-fueled motor and an electric-fueled motor. A rear drive axle and a first pair of rear wheels may be coaxially mounted to the rear drive axle. A front driven axle and a second pair of rear wheels may be coaxially mounted to the front driven axle. The power-operated reel lawn mower may further include a first, second and third user interfaces connected to the body respectively. A controller may be communicatively coupled to the first, second and third user interfaces respectively. A plurality of first and second switches may be communicatively coupled to the controller, whereby the first switch may be selectively mated to the electric-fueled motor, while the second switch may be selectively mated to the gas-fueled motor.

The first, second and third user interfaces may further generate and transmit input signals to the controller upon receiving corresponding user inputs respectively. In this way, upon receiving the input signals, the controller generates and transmits corresponding output signals to the first and second switches respectively and thereby toggles the gas-fueled and electric-fueled motors between operating and non-operating modes respectively. Such an arrangement provides the unexpected and unpredictable advantage of having a hybrid engine assembly adapted to a users need to alternate between the use of an electric-fueled motor or a gas-fueled motor as desired.

The invention may further include a method of utilizing a combined reel lawn mower and multifunctional blade assembly for allowing a user to perform various seasonal functions. Such a method preferably include the chronological steps of: providing a power-operated reel lawn mower including a body; providing and removably conjoining a front attachment assembly to a front end of the body; providing and rotating the front attachment assembly in clockwise and counter clockwise directions; and providing for automatically locking and unlocking the front attachment assembly between non-rotatable and rotatable modes respectively by vertically adjusting a front end of the body between lowered and raised positions above a ground surface respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 7 is a perspective view showing one embodiment of the front attachment assembly for chopping ice;

FIG. 8 is a perspective view showing another embodiment of the front attachment assembly for grass cutting;

FIG. 9 is a perspective view showing another embodiment of the front attachment assembly for tiling soil;

FIG. 10 is a perspective view showing another embodiment of the front attachment assembly for sweeping and removing debris;

FIG. 12 is a side elevational view showing the shaft at an extended equilibrium position;

FIG. 12A is a cross-sectional view of the shaft taken along line 12A-12A in FIG. 12;

FIG. 12B is a cross-sectional view taken along line 12B-12B showing the shaft at a compressed tensioned position along with the arm positioned in the knob aperture for locking the front attachment assembly at a non-rotational position;

DETAILED DESCRIPTION OF THE INVENTION

Figure 1:
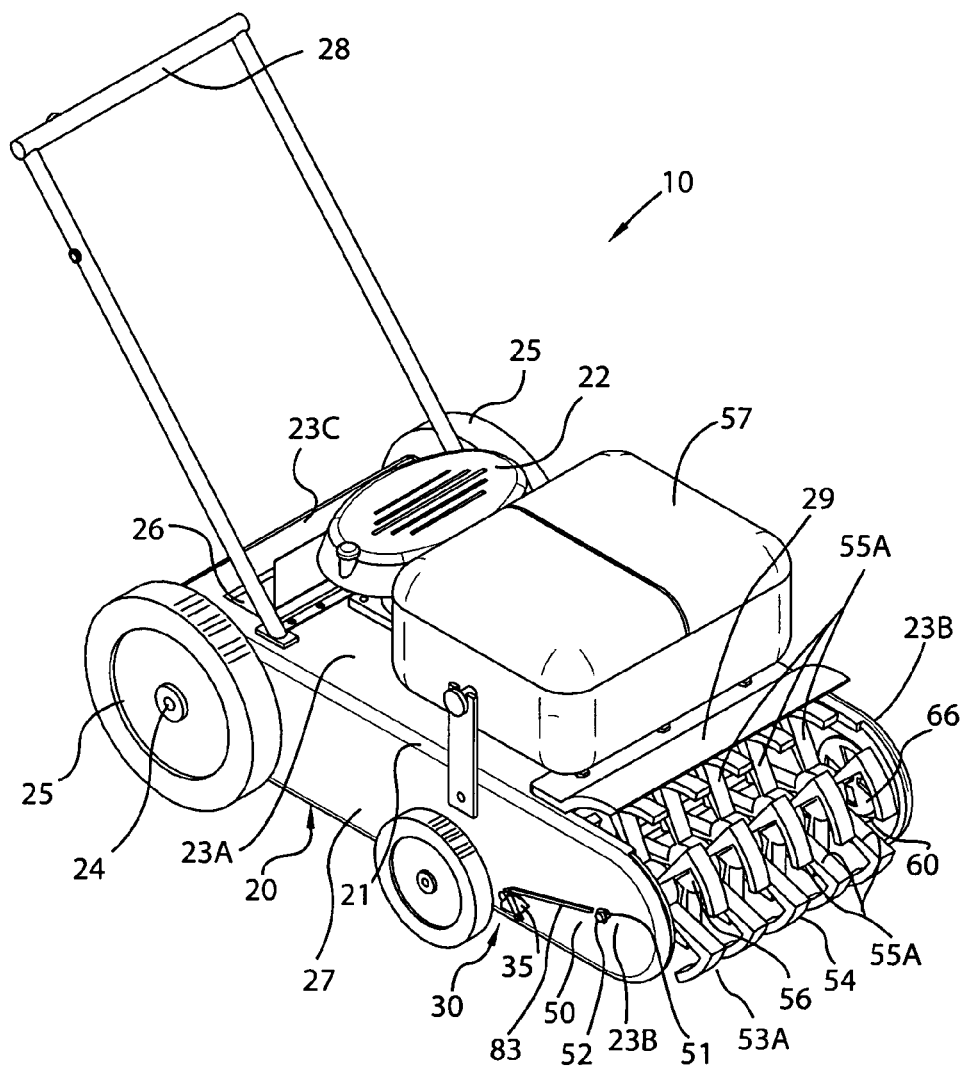
FIG. 1 is a top perspective view showing a multi-functional tool head assembly for lawn mowers wherein a front attachment assembly is lockable by a vertical adjusting mechanism having an arm extending along lateral sides of the lawn mower body.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Applicant's previous U.S. patent application Ser. No. 11/525,156, filed on Sep. 22, 2006, is now abandoned. The present application discloses additions to the subject matter disclosed in the aforementioned U.S. Patent Application.

The present invention is referred to generally in FIGS. 1-14 by the reference numeral 10 and is intended to provide a combined reel lawn mower and multifunctional blade assembly for allowing a user to perform various seasonal functions. It should be understood that the present invention 10 may be used to perform many different tasks and should not be limited in use to only, cutting grass, moving snow, sweeping surfaces, and tilling soil.

Referring initially to FIGS. 1-14, the assembly 10 includes a power-operated reel lawn mower 20 that has a rectangular-shaped body 21 and a gas-fueled motor 22 directly coupled, without the use of intervening elements, to a top surface 23A thereof. Of course, the body 20 may be produced in a variety of alternate shapes and sizes, and may be provided with an electrically powered motor, as is obvious to a person of ordinary skill in the art. Such a reel lawn mower 20 further has a rear axis 24 and a pair of rear wheels 25 coaxially mounted to the rear axis 24.

The reel lawn mower 20 also includes a handle 28 attached to a rear end 23C of the body 21 that extends upwardly and rearwardly of the body 21 such that a user can conveniently maneuver the assembly 10 across a number of surfaces by applying a pushing or pulling force to the handle 28. The reel lawn mower 20 further includes a shield 29 attached to the front end 23B of body 21 that is essential for advantageously preventing debris, snow and grass clippings from being rearwardly propelled at the user during operating conditions.

Referring to FIGS. 1, 2, 3, 5 and 6, a mechanism 30 is included for independently and vertically adjusting a front end 23B of the body 21, which is vital such that the front end 23B conveniently and automatically lowers and raises above a ground surface while the rear end 23C of the body 21 remains statically spaced from the ground surface. Such a front end adjusting mechanism 30 causes the body 21 to pivot about the rear axis 24 in such a manner that the rear axis 24 effectively defines a fulcrum axis for the body 21. The front end adjusting mechanism 30 includes a rectilinear bar 31 that is countersunk within a recess 32 formed at a bottom surface 23D of the body 21. Such a recess 32 is disposed proximal to the front end 23B of the body 21 and traverses along an entire width thereof, as perhaps best shown in FIGS. 2 and 5.

Again referring to FIGS. 1, 2, 3, 5 and 6, the front end adjusting mechanism 30 further includes a pair of rollers 33 journaled about axially opposed ends 34 of the bar 31. A lever 35 is directly coupled, without the use of intervening elements, to the bar 31 and protrudes outwardly from the body 21 in such a manner that the user can effectively and adapt the lever 35 between up and down positions for conveniently biasing the rollers 33 between the raised and lowered positions. This is a vital feature for allowing the user to quickly and easily adjust the height of the assembly 10 as the terrain on and over which the assembly 10 is pushed changes. Such rollers 33 directly engage, without the use of intervening elements, the ground surface and effectively cause the front attachment assembly 50 (described herein below) to rise and fall as the lever 35 is adapted between the up and down positions, respectively. This is a particularly essential feature when employing the grass cutting mechanism 53A (described herein below) with the front attachment assembly 50 for conveniently and effectively allowing a user to alter the length of their grass clippings as they desire.

Referring to FIGS. 2, 5 and 6-7, a mechanism 40 is included for dispensing salt from an underside 23D of the body 21. Such a salt-dispensing mechanism 40 is independently operable from the front end adjusting mechanism 30. The salt-dispensing mechanism 40 includes a chute 41 that is seated subjacent to an opening 26 formed in a top surface 23A of the body 21. A dispensing nozzle 42 is rotatably coupled to the chute 41, which is crucial for effectively and conveniently scattering salt about the ground surface as the reel lawn mower 20 is propelled forwardly and rearwardly. Such a salt dispensing mechanism 40 is particularly useful for increasing the rate at which ice melts such that it can advantageously more easily be removed from a ground surface. Of course, the salt dispensing mechanism 30 may also be used for dispensing other substances like fertilizer and other well known granular and powdered lawn treatments, as is obvious to a person of ordinary skill in the art.

Referring to FIGS. 1-14, a front attachment assembly 50 is removably conjoined directly, without the use of intervening elements, to the front end 23B of the body 21 and is spaced from the front end adjusting mechanism 30 in such a manner that the user can advantageously independently remove the front attachment assembly 50 without modifying a position of the front end adjusting mechanism 30, thus saving the user a considerable amount of time, effort and energy. Such a front attachment assembly 50 includes a rectilinear shaft 51 that has opposed end portions 52 directly and removably interfitted, without the use of intervening elements, within lateral sides 27 of the body 21.

Referring to FIGS. 1-3, 5-7, and 12-14, the front attachment assembly 50 includes a mechanism 53A for cutting grass from a ground surface. Such a grass cutting mechanism 53A includes a plurality of blade assemblies 54 slidably and removably positional along the shaft 51. Each of the blade assemblies 54 includes a plurality of coextensively L-shaped blades 55A. An annular central hub 56 is monolithically formed with the L-shaped blades 55A. Such central hubs 56 are juxtaposed along a longitudinal length of the shaft 51 and are journaled thereabout such that the blade assemblies 54 effectively rotate in sync during operating conditions, which is important for resulting in an evenly cut and attractive lawn.

The grass cutting mechanism 53A also includes a collection bin 57 that is removably and directly coupled, without the use of intervening elements, to the top surface 23A of the body 21. Such a collection bin 57 is vital for gathering grass clippings as they are propelled away from the L-shaped blades 55A. Of course, the user does not have to attach the collection bin 57 if they wish for the clippings to remain on the lawn and act as a fertilizer, as is obvious to a person of ordinary skill in the art.

Referring to FIGS. 4-7, the front attachment assembly 50 includes a mechanism 53B for chopping ice from the ground surface. Such an ice chopping mechanism 53B includes a unitary blade 55B that is helically disposed about and directly attached to, without the use of intervening elements, the shaft 51. Such a helical blade 55B is partially offset from a vertical axis, which is important for allowing the blade to effectively scoop ice from a ground surface. The ice chopping mechanism further includes an expelling chute 58 that is removably and directly coupled, without the use of intervening elements, to the top surface 23A of the body 21 that is critical for forcefully dispelling snow and ice laterally away from the reel lawn mower 20.

Referring to FIG. 10, the front attachment assembly 50 also includes a mechanism 53C for sweeping and removing debris from the ground surface. Such a debris sweeping and removing mechanism 53C includes a plurality of disc-shaped brushes 55C that are slidably positional along the shaft 51. The brushes 55C are journaled about the shaft 51 and are rotatable in sync, which is critical such that a maximum surface area can simultaneously be swept by the brushes 55C. The collection bin 57 discussed herein above can conveniently also be employed in conjunction with the debris sweeping and collecting mechanism 53C for amassing and storing the swept debris, as is shown in FIG. 2.

Referring to FIG. 9, the front attachment assembly 50 further includes a mechanism 53D for effectively tilling soil on the ground surface. Such a soil tilling mechanism 53D includes a plurality of coextensively star-shaped medallions 55D slidably positioned along the shaft 51 and equidistantly juxtaposed such that the star-shaped medallions 55D rotate in sync about the shaft 51 during operating conditions, which is crucial such that a maximum surface area of soil can simultaneously be tilled. Such star shaped medallions 55D include a plurality of tips 59 that are important for penetrating the ground surface during operating conditions. When the front end adjusting mechanism 30 is adapted to the highest setting the soil tilling mechanism 53D can alternately be used for soil aerating purposes since only the tips 59 of the star shaped medallions 55D will effectively penetrate the soil at such a maximum height setting.

Figure 2:
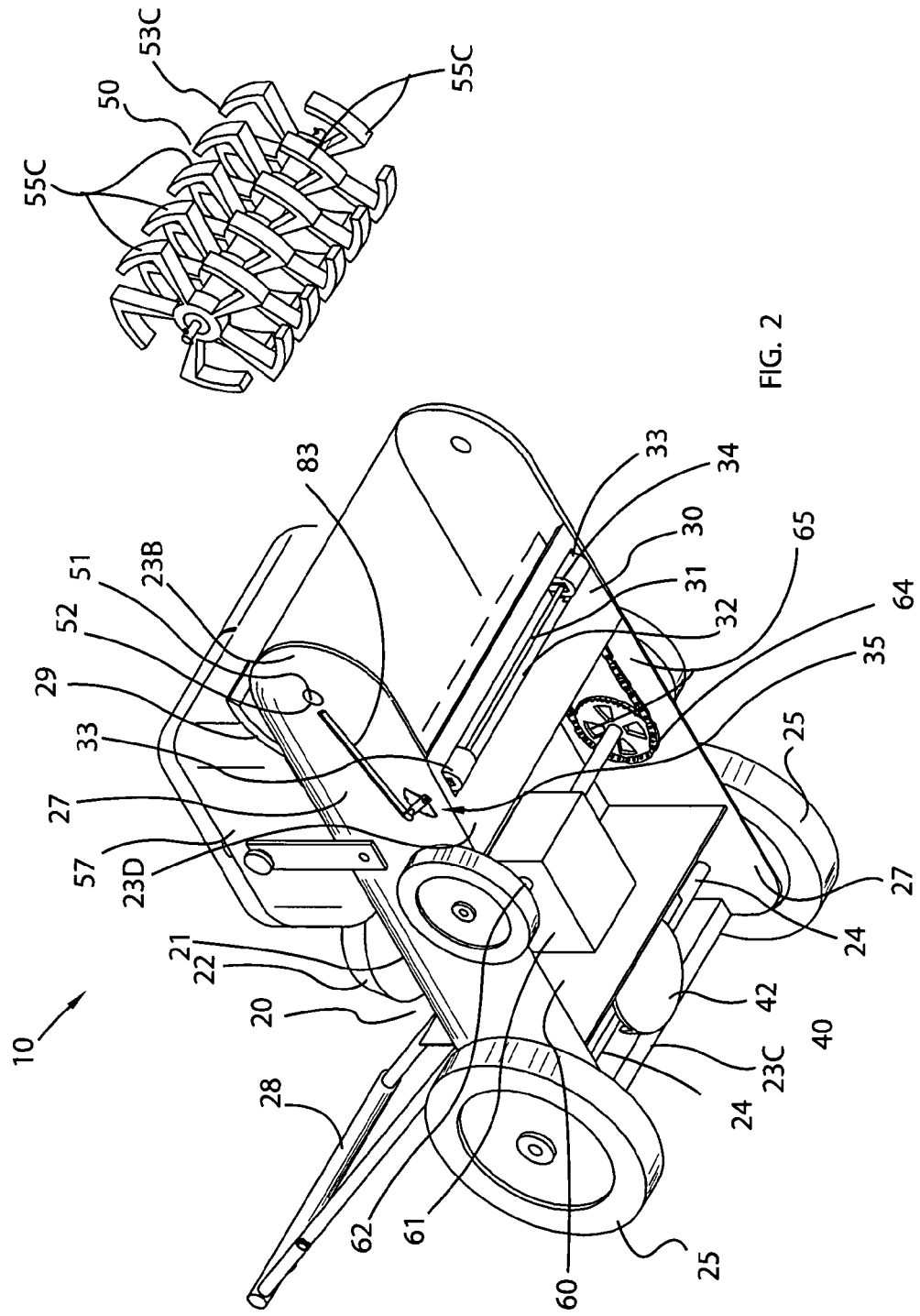
FIG. 2 is a bottom perspective view showing the front attachment assembly removed from the lawn mower when the arm is detached from the shaft knob.
Figure 3:
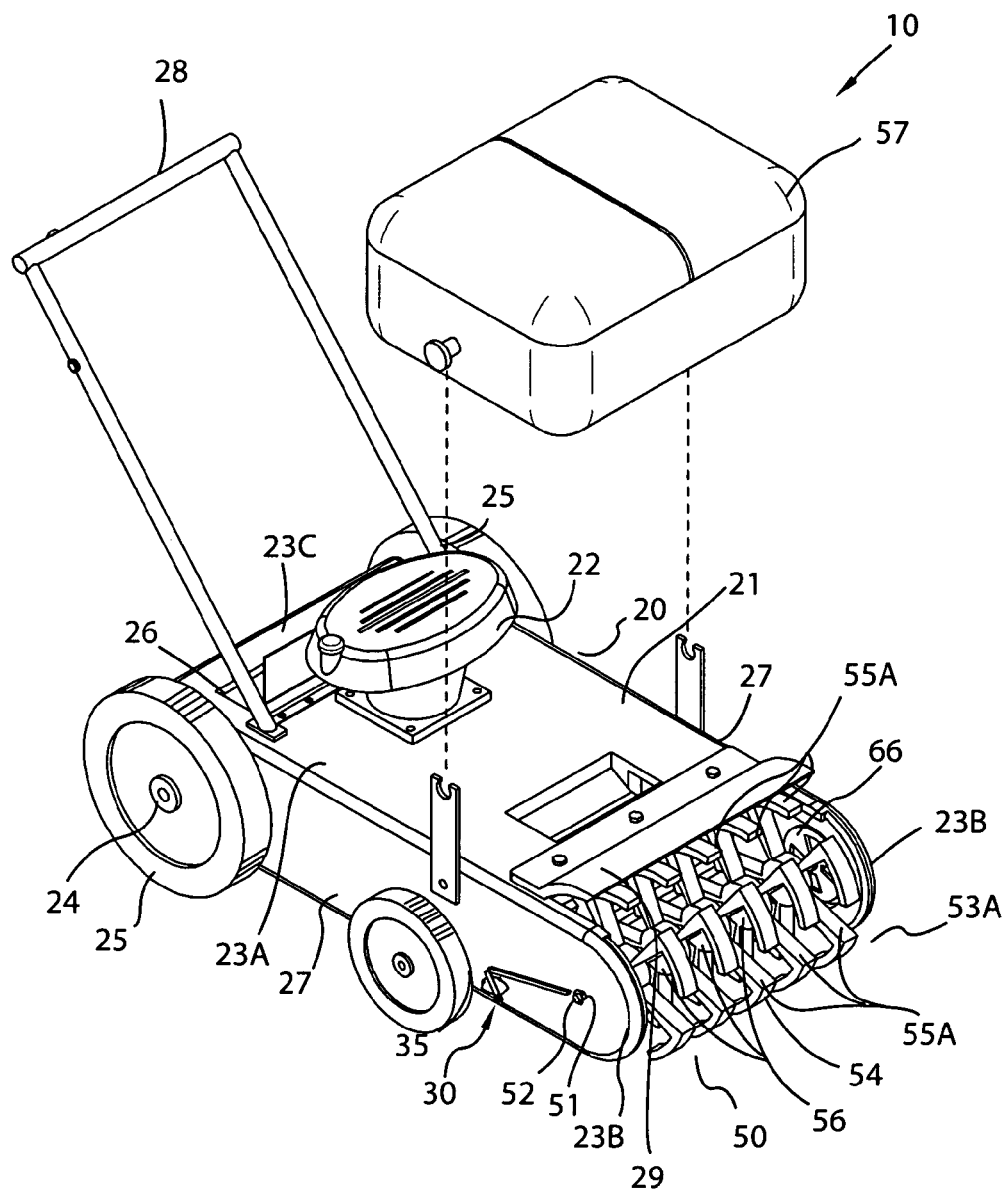
FIG. 3 is a perspective view of the assembly shown in FIG. 1, showing the collection hopper removed from the reel lawn mower.
Figure 4:
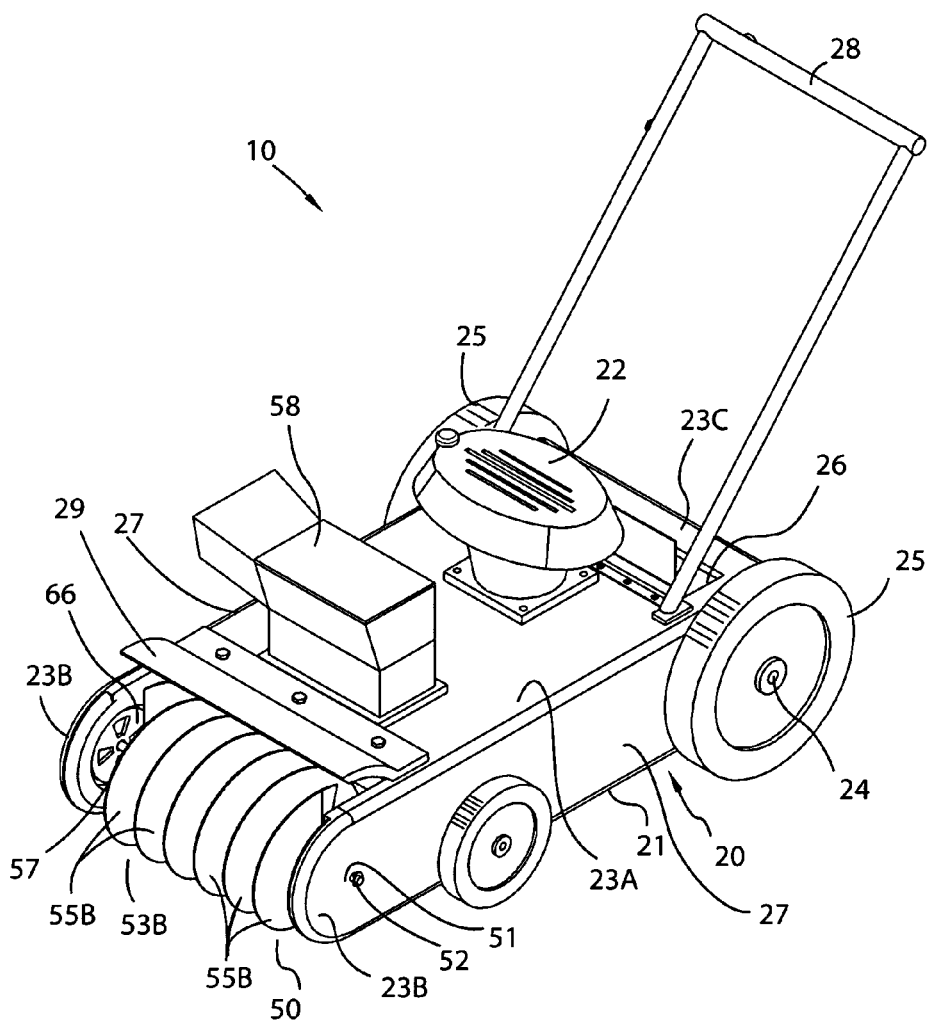
FIG. 4 is a perspective view showing a projection chute attached to the lawn mower, in accordance with an alternate embodiment of the present invention.
Figure 5:
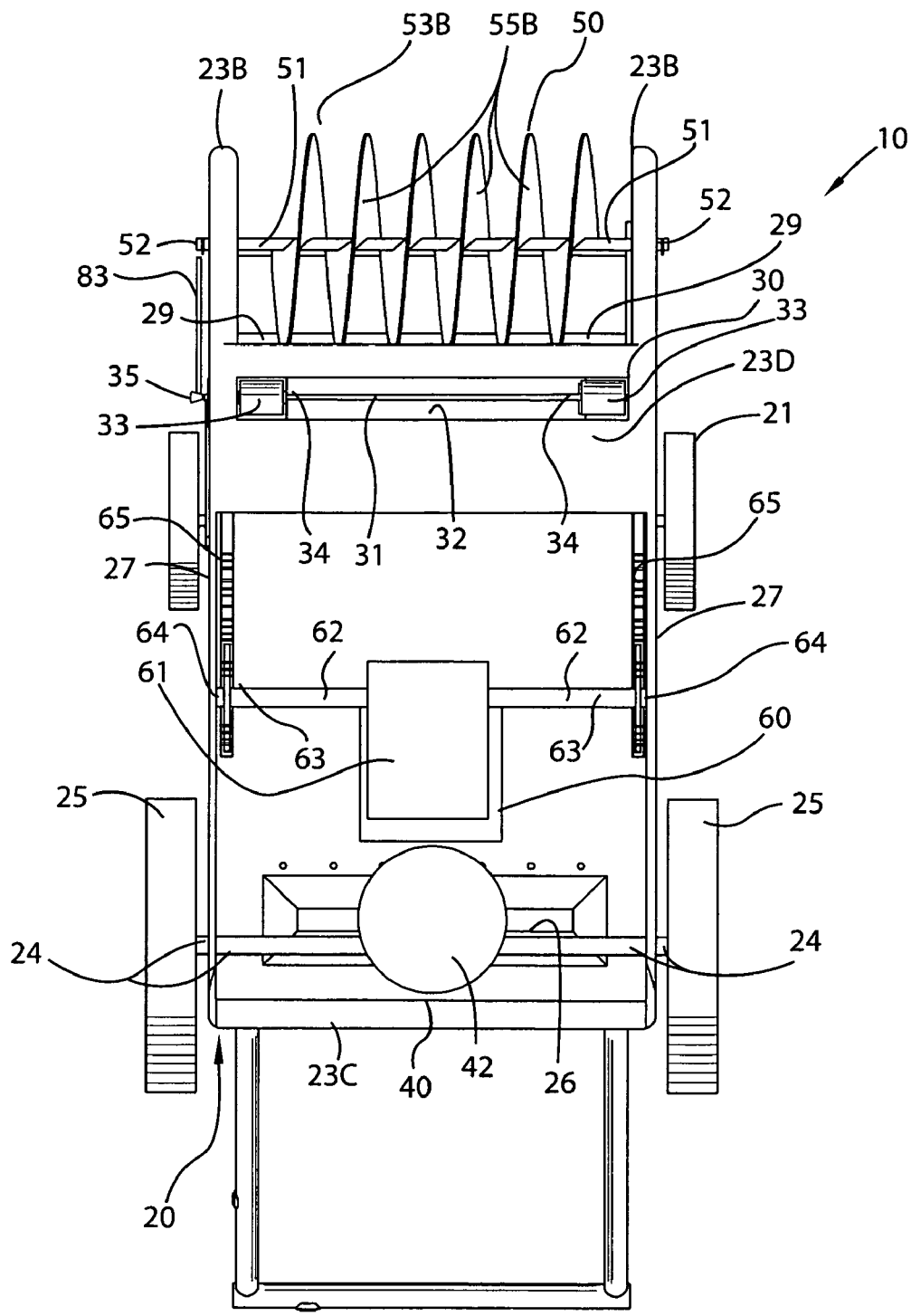
FIG. 5 is a bottom plan view of the salt-dispensing mechanism in FIG. 4.
Figure 6:
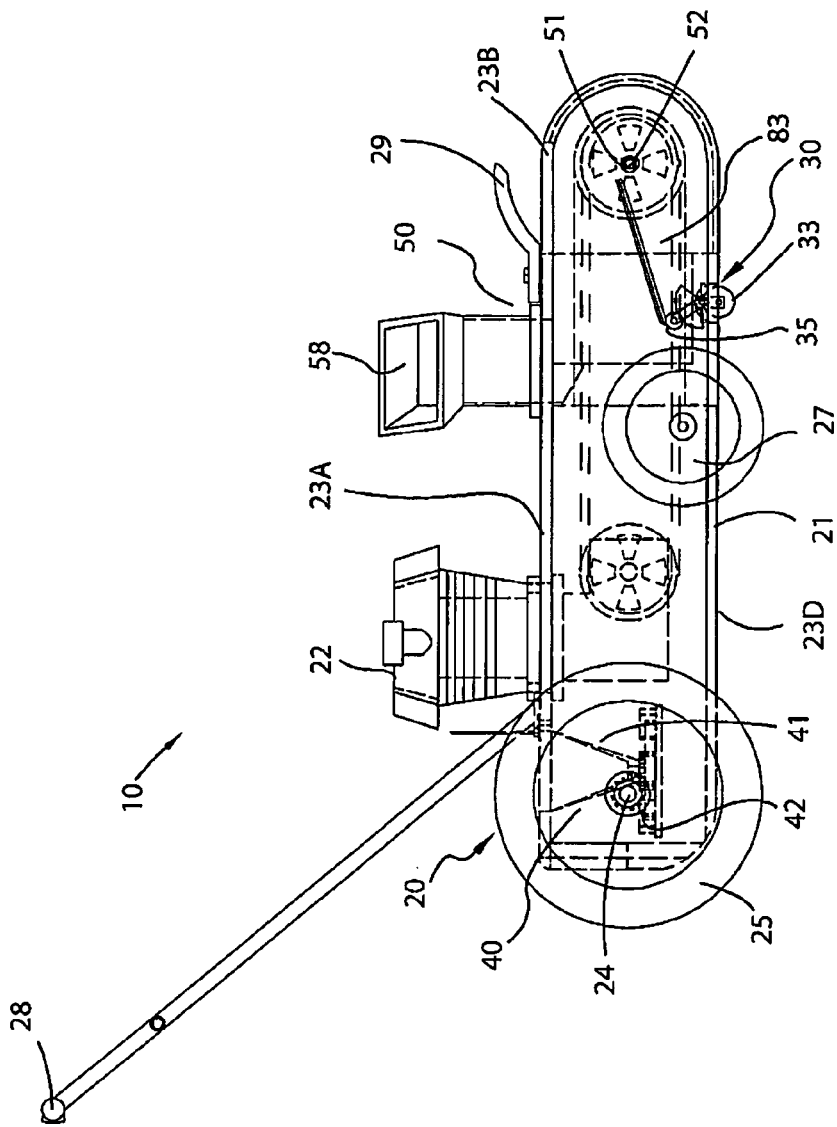
FIG. 6 is a side-elevational view showing the relative positions of the roller and front attachment assembly while the arm is detached from the shaft knob.

Referring to FIGS. 2, 5 and 6, a mechanism 60 is included for rotating the front attachment assembly 50 in clockwise and counterclockwise directions. Such a rotating mechanism 60 is directly coupled, without the use of intervening elements, to the front attachment assembly 50 and is spaced from the front end adjusting mechanism 30, which is important such that the front attachment assembly 50 can be independently rotated while the user adjusts a vertical height of the front end 23B by adapting the front end adjusting mechanism 30 between raised and lowered positions. The rotating mechanism 60 is spaced from the salt-dispensing mechanism 40.

Still referring to FIGS. 2, 5 and 6, such a rotating mechanism 60 includes a motor 61 that has a unitary drive shaft 62 directly coupled, without the use of intervening elements, thereto. The drive shaft 62 has axially opposed end portions 63 seated adjacent to lateral sides 27 of the body 21. A pair of rear driven gears 64 have associated pulley chains 65 mounted thereabout and are operably coupled to the shaft 62. At least one front driven gear 66 is coupled to at least one of the pulley chains 65. The shaft 51 effectively rotates when the drive shaft 62 operates the pair of rear driven gears 64 and the at least one front driven gear 66 in corresponding directions respectively.

Referring to FIGS. 1-14, the front attachment assembly 50 may be removably conjoined to a front end 23B of the body 21 with a mechanism 30 for vertically adjusting a front end of the body 21 such that the front end of the body 21 is lowered and raised above a ground surface. The body 21 may further include a mechanism 30 for rotating the front attachment assembly 50 in clockwise and counter clockwise directions. Advantageously, the front attachment assembly 50 may be automatically locked and unlocked between non-rotatable and rotatable modes when the front end adjusting mechanism 30 vertically lowers and raises the front end of the body 21 respectively. Such an arrangement provides the unexpected and unpredictable advantage of ensuring that the front attachment assembly 50 is rotatable only when positioned for use horizontally on the ground. In this manner, when mechanism 30 lifts the front end 23B of body 21, the front attachment assembly 50 is prohibited from rotating.

As perhaps best shown in FIGS. 2 and 12-13A, the front attachment assembly 50 may further include a shaft 51 preferably having axially opposed end portions directly and removably interfitted within lateral sides of the body 21. The shaft 51 may further be resiliently reciprocated along a bi-directional linear path 90 extending parallel to a longitudinal length of the shaft 51. A plurality of knobs 80 may be affixed to the axially opposed end portions of the shaft 51 respectively and outwardly passing through the lateral sides of the body 21 such that the knobs 80, 84 are disposed exterior of the body 21 respectively.

Each knob 80, 84 may include a pair of spring-actuated fingers 81 protruding outwardly therefrom. The longitudinal length of the shaft 51 may be selectively adjusted between extended and contracted positions when each of the spring-actuated fingers 81 at each of the end portion of the shaft 51 are displaced to a compressed position and thereby inwardly passed through the apertures 82 of the lateral sides 23D of body 21, respectively. Such an arrangement provides the unexpected and unpredictable advantage of having a snap-on capability for easily and conveniently attaching shaft 51 to body 21 without the need for a user to use additional tools.

Referring to FIGS. 2 and 5, the front end adjusting mechanism 30 may further include a rectilinear bar 31 countersunk within a recess 32 formed at a bottom surface of the body 21. Such a recess 32 may be disposed proximal to the front end 23B of the body 21 and traverses along an entire width thereof. A pair of rollers 33 may be journaled about axially opposed ends of bar 31. A lever 35 may be directly coupled to the bar 31 and protrudes outwardly from the body 21 in such a manner that lever 35 is rotatably biased between up and down positions and thereby biases the rollers 33 between the raised and lowered positions respectively.

In this manner, rollers 33 may be adapted to directly engage the ground surface and cause the front attachment assembly 50 to rise and fall as lever 35 is adapted between the up and down positions respectively. Such an arrangement provides the unexpected and unpredictable advantage of using the rollers 33 as a fulcrum to assist in raising the front attachment assembly 50 so that less strength is needed by a user when assembling the front attachment assembly 50.

Referring again to FIGS. 1-6 and 12-13A, the front end adjusting mechanism 30 may further include a rectilinear arm 83 preferably having a proximal end mated to lever 35 and protruding forwardly towards the front end 23B of body 21. Knob 84 is advantageously provided with an aperture 82 formed therein. The arm 83 may include a distal end removably interfitted within aperture 82 of knob 84. In this way, arm 83 is automatically urged forwardly towards knob 84 and thereby becomes interfitted within aperture 82 when lever 35 is rotatably displaced to the down position. Advantageously, arm 83 is automatically urged rearward away from knob 84 and thereby ejected from aperture 82 when lever 35 is rotatably displaced to the up position. Such a structural arrangement between arm 83 and aperture 82 is critical for ensuring the front attachment assembly 50 is automatically locked and unlocked when rollers 33 are lowered and raised from the ground surface by rotatably displacing lever 35 along an arcuate path.

Figure 11:
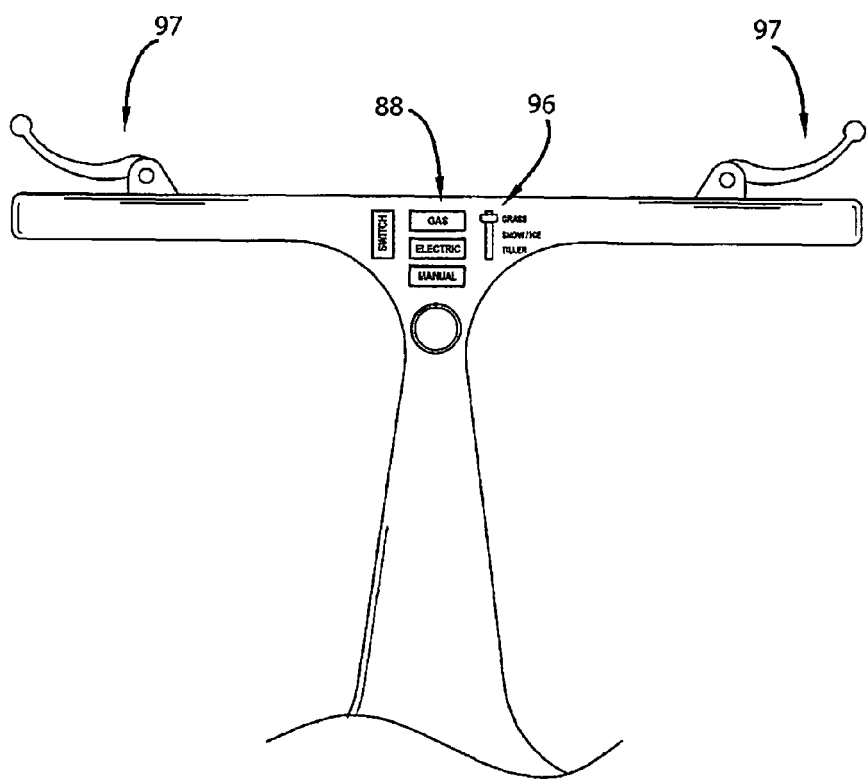
FIG. 11 is a front elevational view showing the user interfaces attached to handle.
Figure 13A:
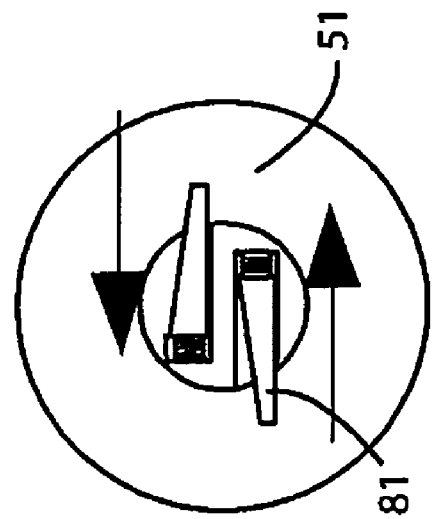
FIG. 13A is a front elevational view showing the fingers at a retracted tensioned position after being linearly displaced into the holes of the shaft knob.
Figure 13:
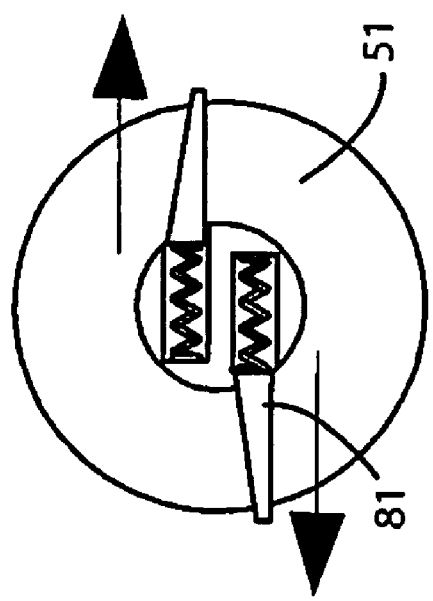
FIG. 13 is a front elevational view showing the spring-actuated fingers at an extend equilibrium position for preventing the shaft from being detached from the lawn mower body.
Figure 14:
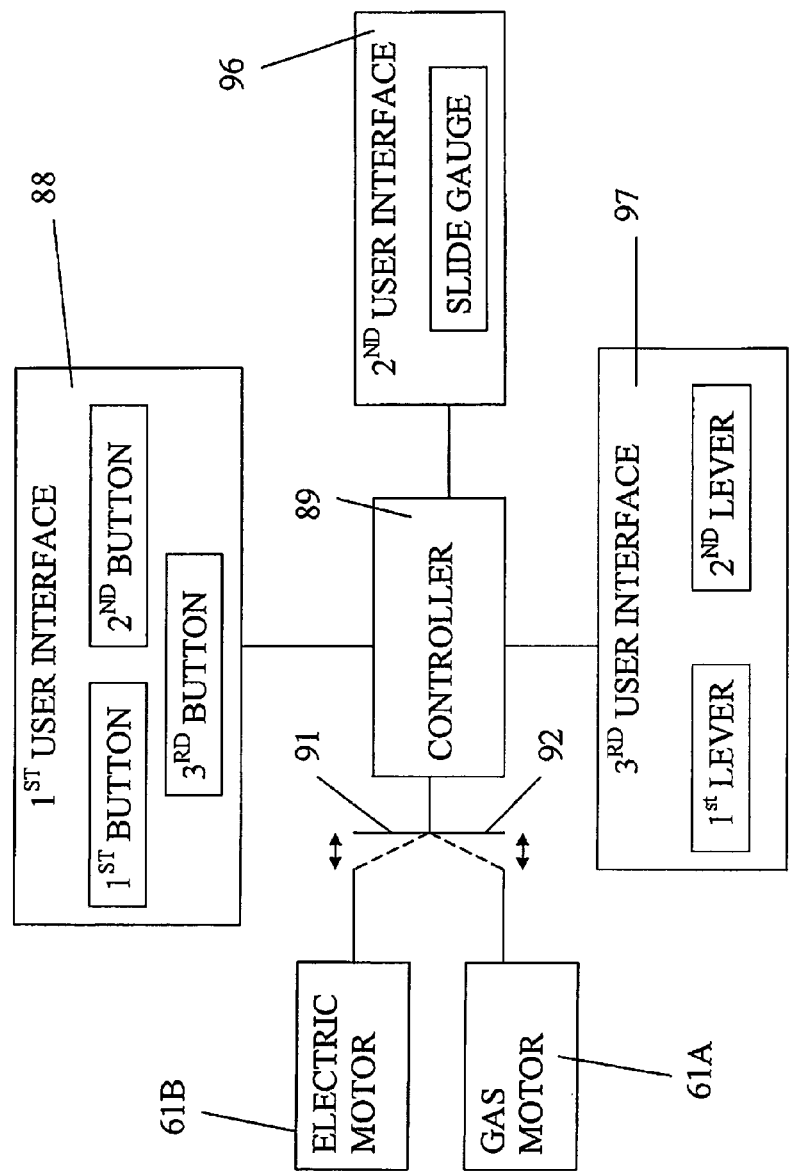
FIG. 14 is a high-level schematic block diagram showing the interrelationship between the major electrical components of the user interfaces, controller, switch and electric/gas motors, respectively.

Referring to FIGS. 11 and 14, the power-operated reel lawn mower 20 may further include a gas-fueled motor 61A and an electric-fueled motor 61B. A rear drive axle 24 and a first pair of rear wheels 25 may be coaxially mounted to the rear drive axle 24. A second pair of wheels 87 may be mounted to lateral sides of body 21.

The power-operated reel lawn mower 10 may further include first, second and third user interfaces 88, 96, 97 connected to body 21 respectively. A controller 89 may be communicatively coupled to the first, second and third user interfaces 88, 96, 97, respectively. A plurality of first and second switches 91, 92 may be communicatively coupled to the controller 89, whereby the first switch 91 may be selectively mated to the electric-fueled motor 61A, while the second switch 92 may be selectively mated to the gas-fueled motor 61B. The first, second and third user interfaces 88, 96, 97 may further generate and transmit input signals to the controller 89 upon receiving corresponding user inputs respectively. In this way, upon receiving the input signals, the controller 89 generates and transmits corresponding output signals to the first and second switches 91, 92 respectively and thereby toggles the gas-fueled and electric-fueled motors 61A, 61B between operating and non-operating modes respectively. Such an arrangement provides the unexpected and unpredictable advantage of having a hybrid engine assembly adapted between the use of an electric-fueled motor 61A or a gas-fueled motor 61B as desired by the user.

The invention may further include a method of utilizing a combined reel lawn mower and multifunctional blade assembly 10 for allowing a user to perform various seasonal functions. Such a method preferably include the chronological steps of: providing a power-operated reel lawn mower 20 including a body 21; providing and removably conjoining a front attachment assembly 50 to a front end 23B of the body 21; rotating the front attachment assembly 50 in clockwise and counter clockwise directions; and automatically locking and unlocking the front attachment assembly 50 between non-rotatable and rotatable modes respectively by vertically adjusting the front end 23B of the body 21 between lowered and raised positions above a ground surface respectively.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A combined reel lawn mower and multifunctional blade assembly for allowing a user to perform various seasonal functions, said combined reel lawn mower and multifunctional blade assembly comprising:
    a reel lawn mower including a body;
    a front attachment assembly conjoined to a front end of said body;
    means for vertically adjusting a front end of said body such that said front end of said body is lowered and raised above a ground surface; and
    means for rotating said front attachment assembly in clockwise and counter clockwise directions;
    wherein said front attachment assembly is locked and unlocked between non-rotatable and rotatable modes respectively when said front end adjusting means vertically lowers and raises said front end of said body respectively;
    wherein said front attachment assembly comprises
    a shaft having axially opposed end portions directly and removably interfitted within lateral sides of said body, said shaft being resiliently reciprocated along a bi-directional linear path extending parallel to a longitudinal length of said shaft; and
    a plurality of knobs affixed to said axially opposed ends portions of said shaft respectively and outwardly passing through said lateral sides of said body such that said knobs are disposed exterior of said body respectively, each of said knobs having a pair of spring-actuated fingers protruding outwardly therefrom respectively;
    wherein said longitudinal length of said shaft is selectively adjusted between extended and contracted positions when each of said spring-actuated fingers at each of said end portions of said shaft are displaced to a compressed position and thereby inwardly passed through said apertures of said lateral sides of said body respectively.

2. The combined reel lawn mower and multifunctional blade assembly of claim 1, wherein said front end adjusting means comprises:
    a rectilinear bar countersunk within a recess formed at a bottom surface of said body, said recess being disposed proximal to said front end of said body and traversing along an entire width thereof;
    a pair of rollers journaled about axially opposed ends of said bar; and
    a lever directly coupled to said bar and protruding outwardly from said body in such a manner that said lever is rotatably biased between up and down positions and thereby bias said rollers between the raised and lowered positions respectively;
    wherein said rollers are adapted to directly engage the ground surface and cause said front attachment assembly to rise and fall as said lever is adapted between said up and down positions respectively;
    wherein one of said knobs is provided with an aperture formed therein.

3. The combined reel lawn mower and multifunctional blade assembly of claim 2, wherein said front end adjusting means further comprises:
    a rectilinear arm having a proximal end mated to said lever and protruding forwardly towards said front end of said body, said arm further having a distal end removably interfitted within said aperture of said one knob;
    wherein said arm is automatically urged forwardly towards said one knob and thereby interfitted within said aperture when said lever is rotatably displaced to said down position;
    wherein said arm is automatically urged rearwards away from said one knob and thereby ejected from said aperture when said lever is rotatably displaced to said up position.

4. The combined reel lawn mower and multifunctional blade assembly of claim 1, wherein said power-operated reel lawn mower comprises:
    a gas-fueled motor;
    an electric-fueled motor;
    a rear drive axle and a first pair of rear wheels coaxially mounted to a said rear drive axle;
    a second pair of rear wheels mounted to said body;
    first, second and third user interfaces connected to said body respectively;
    a controller communicatively coupled to said first, second and third user interfaces respectively;
    first and second switches communicatively coupled to said controller, said first switch being selectively mated to said electric-fueled motor, said second switch being selectively mated to said gas-fueled motor;
    wherein said first, second and third user interfaces generate and transmit input signals to said controller upon receiving corresponding user inputs respectively;

wherein, upon receiving said input signals, said controller generates and transmits corresponding output signals to said first and second switches respectively and thereby toggles said gas-fueled and electric-fueled motors between operating and non-operating modes respectively.

5. A combined reel lawn mower and multifunctional blade assembly for allowing a user to perform various seasonal functions, said combined reel lawn mower and multifunctional blade assembly comprising:

a power-operated reel lawn mower including a body;

a front attachment assembly removably conjoined to a front end of said body;

means for vertically adjusting a front end of said body such that said front end of said body is lowered and raised above a ground surface; and means for rotating said front attachment assembly in clockwise and counter clockwise directions;

wherein said front attachment assembly is locked and unlocked between non-rotatable and rotatable modes respectively when said front end adjusting means vertically lowers and raises said front end of said body respectively;

wherein said front attachment assembly comprises a shaft having axially opposed end portions directly and removably interfitted within lateral sides of said body, said shaft being resiliently reciprocated along a bi-directional linear path extending parallel to a longitudinal length of said shaft; and a plurality of knobs affixed to said axially opposed ends portions of said shaft respectively and outwardly passing through said lateral sides of said body such that said knobs are disposed exterior of said body respectively, each of said knobs having a pair of spring-actuated fingers protruding outwardly therefrom respectively;

wherein said longitudinal length of said shaft is selectively adjusted between extended and contracted positions when each of said spring-actuated fingers at each of said end portions of said shaft are displaced to a compressed position and thereby inwardly passed through said apertures of said lateral sides of said body respectively.

6. The combined reel lawn mower and multifunctional blade assembly of claim 5, wherein said front end adjusting means comprises:

a rectilinear bar countersunk within a recess formed at a bottom surface of said body, said recess being disposed proximal to said front end of said body and traversing along an entire width thereof;

a pair of rollers journaled about axially opposed ends of said bar; and a lever directly coupled to said bar and protruding outwardly from said body in such a manner that said lever is rotatably biased between up and down positions and thereby bias said rollers between the raised and lowered positions respectively;

wherein said rollers are adapted to directly engage the ground surface and cause said front attachment assembly to rise and fall as said lever is adapted between said up and down positions respectively;

wherein one of said knobs is provided with an aperture formed therein.

7. The combined reel lawn mower and multifunctional blade assembly of claim 6, wherein said front end adjusting means further comprises:

a rectilinear arm having a proximal end mated to said lever and protruding forwardly towards said front end of said body, said arm further having a distal end removably interfitted within said aperture of said one knob;

wherein said arm is automatically urged forwardly towards said one knob and thereby interfitted within said aperture when said lever is rotatably displaced to said down position;

wherein said arm is automatically urged rearwards away said one knob and thereby ejected from said aperture when said lever is rotatably displaced to said up position.

8. The combined reel lawn mower and multifunctional blade assembly of claim 5, wherein said power-operated reel lawn mower comprises:

a gas-fueled motor;

an electric-fueled motor;

a rear drive axle and a first pair of rear wheels coaxially mounted to a said rear drive axle;

a second pair of rear wheels mounted to said body;

first, second and third user interfaces connected to said body respectively;

a controller communicatively coupled to said first, second and third user interfaces respectively;

first and second switches communicatively coupled to said controller, said first switch being selectively mated to said electric-fueled motor, said second switch being selectively mated to said gas-fueled motor;

wherein said first, second and third user interfaces generate and transmit input signals to said controller upon receiving corresponding user inputs respectively;

wherein, upon receiving said input signals, said controller generates and transmits corresponding output signals to said first and second switches respectively and thereby toggles said gas-fueled and electric-fueled motors between operating and non-operating modes respectively.

\* \* \* \* \*